United States Patent
Lin et al.

(10) Patent No.: US 9,386,549 B2
(45) Date of Patent: Jul. 5, 2016

(54) SYNCHRONISATION IN A COMMUNICATION SYSTEM

(75) Inventors: Jie Zhen Lin, Beijing (CN); Peter Skov, Beijing (CN); Xin Xia, Beijing (CN); Chun Hai Yao, Beijing (CN); Dong Zhao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 724 days.

(21) Appl. No.: 13/579,069

(22) PCT Filed: Feb. 15, 2010

(86) PCT No.: PCT/CN2010/000210
§ 371 (c)(1),
(2), (4) Date: Sep. 14, 2012

(87) PCT Pub. No.: WO2011/097770
PCT Pub. Date: Aug. 18, 2011

(65) Prior Publication Data
US 2013/0010668 A1    Jan. 10, 2013

(51) Int. Cl.
*H04W 56/00*    (2009.01)

(52) U.S. Cl.
CPC .............................. *H04W 56/0015* (2013.01)

(58) Field of Classification Search
USPC ........................ 370/310, 312, 328, 389, 390
See application file for complete search history.

(56) References Cited

U.S. PATENT DOCUMENTS

| 2009/0059797 A1* | 3/2009 | Northcutt et al. ............. 370/238 |
| 2010/0074180 A1* | 3/2010 | Palanki et al. ................ 370/328 |

FOREIGN PATENT DOCUMENTS

| CN | 101321027 A | 12/2008 |
| EP | 2 131 511 A2 | 12/2009 |
| EP | 2 139 168 A1 | 12/2009 |
| WO | WO 2008/100795 A1 | 8/2008 |

OTHER PUBLICATIONS

R4-092481, 3GPP TSG-RAN WG4 #51-BIS, Jun.-Jul. 2, 2009, Los Angeles, USA, "Test Proposal for TDD HeNB Time and Frequency Self-Synchronization using Network Listening", Qualcomm Europe, 10 pgs.
R4-093465, 3GPP TSG RAN WG4 Meeting #52, Shenzhen, China, Aug. 24-28, 2009, "Support for Time and Requency Synchronization Using Network Listening", 3GPP Release 9, 3 pgs.
R4-094247, 3GPP TSG RAN WG4 #53 Meeting, Jeju, Korea, Nov. 9-13, 2009, "Consideration on TD-LTE HeNB Synchronization Use Case", Nokia Siemens Networks, Nokia, 2 pgs.

\* cited by examiner

*Primary Examiner* — Feben M Haile
(74) *Attorney, Agent, or Firm* — Harrington & Smith

(57) ABSTRACT

Synchronization in a communication system A method and apparatus for a communication system is disclosed. In the system communications occur via a multiple of nodes each providing a stratum for synchronization. It is determined that the stratum of a node is not included in a predefined set of stratums. In response to said determination synchronizing with the node is provided differently from nodes with stratums without taking the order of the stratum into account. Information about the status can be communicated between nodes.

26 Claims, 3 Drawing Sheets

SYNCHRONISATION IN A COMMUNICATION SYSTEM

This disclosure relates to synchronisation in a communication system comprising a plurality of stations, and more particularly to synchronisation in a scenario where communications occur via a multiple of nodes.

A communication system can be seen as a facility that enables communication sessions between two or more stations nodes such as mobile communication devices and/or other stations. The communications may comprise, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. The user may also be provided broadcast or multicast content. Non-limiting examples of the content include downloads, television and radio programs, videos, advertisements, various alerts and other information.

A communication system, nodes thereof and compatible communication devices typically operate in accordance with a given standard or specification which sets out what the various entities associated with the system are permitted to do and how that should be achieved. Communication protocols and/or parameters which shall be used for the connection are also typically defined. For example, the manner how a communication device can access the communication system and how communication shall be implemented between communicating devices, nodes of the communication system and/or other communication devices is typically based on the standards and protocols.

In a wireless communication system at least a part of communications between at least two wireless stations occurs over a wireless link. Examples of wireless systems include public land mobile networks (PLMN), satellite based communication systems and different wireless local networks, for example wireless local area networks (WLAN). A wireless system can be divided into cells, such system being often referred to as a cellular system.

A user can access the communication system by means of an appropriate communication device. A communication device is provided with an appropriate signal receiving and transmitting arrangement for enabling communications with other parties. Typically a communication device is used for enabling the users thereof to receive and transmit communications such as speech and data. In wireless systems, a communication device provides a transceiver that can communicate with e.g. a base station of an access network and/or another communications device. Depending on the context, a communication device may also be considered as being a part of a communication system. In certain applications, for example in ad-hoc networks, the communication system can at least partially be based on use of a plurality of communication devices capable of communicating with each other as the nodes of the system.

$3^{rd}$ Generation Partnership Project (3GPP) is standardizing an architecture that is known as the long-term evolution (LTE) of the Universal Mobile Telecommunications System (UMTS) radio-access technology. A further development of the LTE is referred to herein as LTE-Advanced. In LTE based systems one possible access node or base station type comprises a local access point, for example a femto (access) node. The femto nodes are different from for example cellular base stations nodes in that they can roughly be said to be simpler and serve smaller areas than the next level of nodes, often referred to as macro nodes. The femto nodes are typically deployed in indoor environments, preferably in plug-and-play or self-organizing network (SON) fashion. The demand for capacity by broadband and wireless broadband traffic, in particular over the internet, has increased. Users who are located in a certain space or area, for example at home or office, are becoming increasingly important target customers for wireless operators and solution providers. Self Organizing Network (SON) arrangements are a possible technology to provide appropriate local systems.

Synchronization between base stations such as eNBs, and/or the local access nodes, for example HeNBs, may be needed to avoid co-channel interference that would be introduced by asynchronised operation. Although synchronization based on positioning systems such as the Global Position System (GPS)-based solutions may be used by some of the base stations, a local access node may not be provided with a GPS receiver, and/or GPS signal may not be available or may be too weak for example in indoor applications.

Listening of the network can be used as a synchronization technique by the local nodes. This assumes that a local node can periodically monitor the downlink (DL) waveform of other nodes, and adjust its own transmit time and/or frequency reference according to the received waveform. A common reference signal (CRS) can be used for the tracking. A general scenario would be one-hop synchronization enabling a node to be synchronized with a macro layer node. However, there can be various instances where the macro layer signal cannot be appropriately received. For example, in an in-building distribution case a plurality of local nodes can be deployed deeply inside a building resulting a situation where a sufficiently good quality macro cell signal is not available. In such cases, synchronization between the local nodes may be needed, and this may require multi-hop synchronization.

In the case of multiple synchronisation "hops", the concept of "stratums" is involved. A stratum implicates which synchronization source is followed by a certain node. A stratum number typically indicates the order of the synchronisation source in a chain of nodes. The stratum can also to some extent reflect the synchronization accuracy and reliability.

In order to enable multi-stratum synchronization, the nodes should be made aware of the stratum number of the node they are tracking. Thus it would be desirable to be able to signal this information to relevant nodes. However, the signalling overhead should be kept as low as possible. Thus a 2-bit value for strata expression information element (IE) has been suggested. The 2-bit value supports sending of an indication of up to four stratums. However, there may be scenarios where more than three hops may take place, thus exceeding the four stratum limit. Another problematic issue may emerge from muting slot allocation and identification for stratums exceeding the amount of stratums that can be indicated, as a predefined slot allocation scheme may not be used due to the lack of indication of the order of the stratum.

Embodiments of the invention aim to address one or several of the above issues.

In accordance with an embodiment there is provided a method for a communication system where communications occur via a multiple of nodes each providing a stratum for synchronisation, the method comprising determining that the stratum of a node is not included in a predefined set of stratums, and in response to said determining synchronising with the node differently from nodes with stratums in the predefined set of stratums without taking the order of the stratum into account.

In accordance with another embodiment there is provided a method for a communication system where communications occur via a multiple of nodes each providing a stratum for synchronisation. The method comprises determining that the stratum of the node is not included in a predefined set of stratums where synchronisation with the node would be based at least in part on the order of the stratum, and informing at least one other node that synchronisation with the node shall take place without taking the order of the stratum into account.

In accordance with another embodiment there is provided an apparatus for a node for use in a communication system where communications occur via a multiple of nodes each providing a stratum for synchronisation, the apparatus comprising at least one processor and at least one memory including computer program code. The at least one memory and the computer program code are configured, with the at least one processor, to determine that the stratum of a node is not included in a predefined set of stratums, and in response to said determination to cause synchronisation with the node differently from nodes with stratums in the predefined set of stratums without taking the order of the stratum into account.

In accordance with another embodiment there is provided an apparatus for a node for use in a communication system where communications occur via a multiple of nodes each providing a stratum for synchronisation, the apparatus comprising at least one processor and at least one memory including computer program code. The at least one memory and the computer program code are configured, with the at least one processor, to determine whether the stratum of the node is included in a predefined set of stratums where synchronisation with the node would be based at least in part on the order of the stratum, and to cause, in response to determination that the stratum is not included in the predefined set of stratums, sending of information to at least one other node that synchronisation with the node shall take place without taking the order of the stratum into account.

In accordance with a more specific embodiment the determining comprises determining, based on an indication received from a node, that the synchronisation shall not take the order of the stratum into account. A node can send an indication that synchronisation shall not take the order of the stratum into account.

In accordance with an embodiment the predefined set of stratums can comprise a predefined number of lowest order stratums. An indication can be sent from or received from a node that has a higher order of stratum than the predefined number, the indicator containing information that synchronisation with said node is to be handled differently from nodes with stratums in the predefined set of stratums. In accordance with an embodiment the predefined set of stratums can comprise three lowest order stratums. An indication of the order of the stratum or that the order of the stratum is higher than three in a two-bit information element can be communicated between two nodes. The indication can comprise the order number of the stratum if the stratum of the node is in the predefined set of stratums or a uniform indication if the stratum of the node is not in the predefined set of stratums. The indication can be broadcast by a node.

Synchronisation without taking the order of the stratum into account can be based on selection of a synchronisation source node that has the best signal quality.

It can be determined by default that synchronising shall take place without taking the order of the stratum into account.

Synchronisation that takes the order of the stratum into account can comprise muting of at least one stratum specific position of a period. Synchronisation without taking the order of the stratum into account can comprise detection of muting applied by a synchronisation source node and muting at least one position of the period based on the detection. Synchronisation without taking the order of the stratum into account can comprise muting of at least one Multicast Broadcast Single Frequency Network (MBSFN) frame based on detection of the positioning of at least one MBSNF frame by the node. A frame position corresponding to a detected frame position can be muted and/or a frame position determined based on a detected frame position can be muted.

A computer program comprising program code means adapted to perform the herein described methods may also be provided. In accordance with further embodiments apparatus and/or computer program product that can be embodied on a computer readable medium for providing at least one of the methods is provided.

Various other aspects and further embodiments are described in the following detailed description and in the attached claims.

The invention will now be described in further detail, by way of example only, with reference to the following examples and accompanying drawings, in which:

FIG. 1 shows schematically a network in which some embodiments of the present invention may be implemented;

FIG. 2 schematically shows control apparatus for a node;

FIG. 3 schematically shows a chained synchronization scenario;

Figure 1:
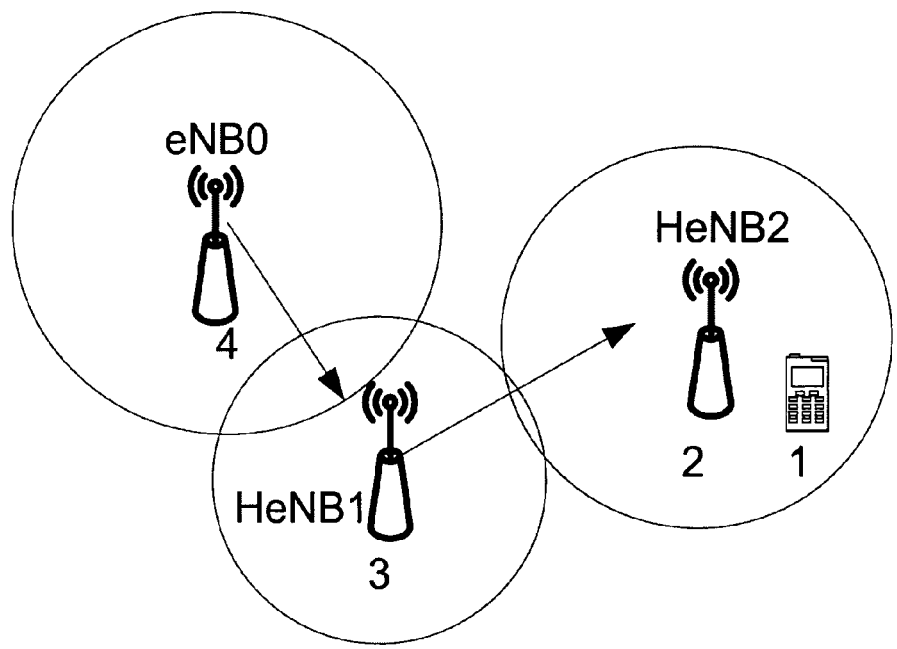

In the following certain exemplifying embodiments are explained with reference to wireless or mobile communication systems serving mobile communication devices. Before explaining in detail the certain exemplifying embodiments, certain general principles of a wireless communication system and the nodes thereof are briefly explained with reference to FIGS. 1 and 2 to assist in understanding of the herein described embodiments.

In a wireless system a user can be provided with a mobile communication or user device 1 that can be used for accessing various services and/or applications. The access can be provided via an access interface between the mobile user devices 1 and an appropriate wireless access system, for example an access node. An access node can be provided by a base station, FIG. 1 example showing three base stations 2, 3 and 4. Each mobile device 1 and base station may have one or more radio channels open at the same time and may receive signals from more than one source. A base station is typically controlled by at least one appropriate controller so as to enable operation thereof and management of mobile communication devices in communication with the base station. The control entity can be interconnected with other control entities. A base station controller is shown and described later in more detail with reference to FIG. 2.

An appropriate mobile user device or station 1 may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A wireless mobile communication device is often referred to as a user equipment (UE).

A communication device can access a communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB (NB) or enhanced NodeB (eNB) in the vocabulary of the 3GPP specifications. Other examples include base stations of systems that are based on technologies such as wireless local area network (WLAN) and/or WiMax (Worldwide Interoperability for Microwave Access). Access nodes can provide macro level base stations, or to use the vocabulary of the 3GPP, macro eNBs. Macro level eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Access nodes may also provide local area access points or femto level nodes, for example home enhanced NodeBs (HeNBs). It is noted that in this specification the term home eNB is intended to cover any local access node, regardless its location and use environment, and thus term shall also be understood to cover similar nodes that may be used for example by enterprises, such as in offices, warehouses and/or factories and/or in public places, for example in shopping malls, sports or exhibition halls or arenas, particular areas of cities and so on.

By way of example only it is noted that femto nodes can have lower transmission power compared to macro NodeBs or eNBs and cheaper RF components such as oscillators and filters, due to relaxed requirements in standards. For example, in LTE HeNB transmission power can be about 100 times lower compared to the transmission power of an eNB and frequency stability requirements are in between the requirements of an eNB and a user equipment. The transmission and reception range for femto nodes may be adapted to small range scenarios. For example, envisaged data rates can be 50 to 100 Mbit/s in the downlink with an average coverage range of 10 meters. The local access nodes, such as access nodes 2 and 3 of FIG. 1, can thus be relatively low power nodes that may be deployed to provide enhanced indoor coverage, additional capacity at hotspots or cell edge regions. For example, in the case of indoor deployment, such an access point or node may be provided for example in apartment blocks or office buildings and hence there may be a relatively high density of such access nodes. These nodes may be operated on the same carrier frequency as the overlying macro layer. That is, the femto nodes may operate on the same frequency as the associated macro base station or may have a dedicated local frequency band.

The femto access nodes may provide operation in a licensed or unlicensed band. The operation may also be out of the network operator control. The access points may have a plug-and-play mode of operation with control, reduced control or no control from the core network. To address the reduced, or no control, the access points can rely on self-organizing functionality. The access points may be arranged to facilitate operations in a dynamic, self-organizing network (SON) based radio environment. These nodes may thus be referred to as optimised local area access points or stations.

Figure 2:
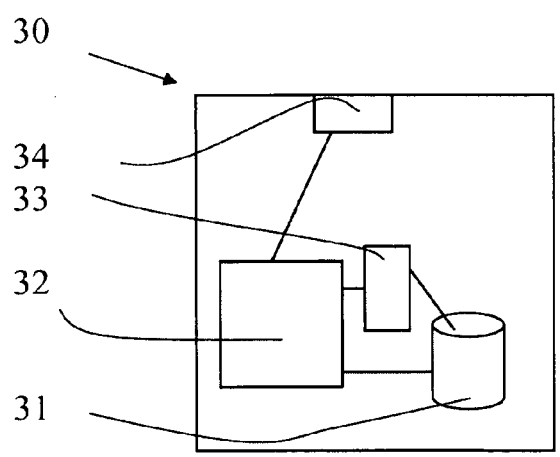

Regardless of its type, an access node is typically controlled by at least one appropriate controller apparatus. FIG. 2 shows an example for a controller apparatus 30. The controller apparatus is typically provided with memory capacity and at least one data processor. FIG. 2 thus shows at least one memory 31, at least one data processing unit 32 and an input/output interface 34. The control apparatus can further comprise a synchronisation control and/or muting block 33. The controller may be configured to execute appropriate software applications to provide the desired control functions. The control apparatus, when provided in a node and comprising at least one memory and computer program code is configured, with the at least one processor, to determine if a stratum of a node is included in a predefined set of stratums, and in response to said determination to cause synchronisation to take place accordingly. At least some of the processing of the processing blocks may be carried out by one or more processors in conjunction with one or more memories. The processing block may be provided by an integrated circuit or a chip set. The control entity can be interconnected with other control entities.

Although not shown in FIG. 1 for simplicity, one or more gateway nodes may be provided for connecting the access nodes to the macro level system via appropriate interfaces. There are various possible interaction methods between the various nodes. Also, although not shown, a gateway function between the access systems, a core network and/or another network such as the packet data network may also be provided by means of appropriate gateway nodes. Regardless of the gateway arrangement, the base station serving a communication device can be connected to an external data network, for example the internet.

The below described detailed embodiments relate to synchronization between access nodes, for example eNBs 4 and local access nodes, or HeNBs 2,3 of FIG. 1, in time division duplexing (TDD) mode. The embodiments aim to avoid or at least mitigate co-channel interference that would be introduced by asynchronised operation. Listening of the network can be used as a synchronization technique by the local nodes, or HeNBs. This assumes that a local HeNB can periodically monitor the downlink (DL) waveform of another node, and adjust its own transmit time and/or frequency reference according to the received waveform. A common reference signal (CRS) can be used for the tracking.

There are various instances where synchronisation to the macro level node 4 may not be possible. For example, in an in-building distribution case a plurality of HeNBs 2, 3 can be deployed deeply in a building resulting a situation where the macro cell signal is not necessarily any longer appropriately received. In such cases, synchronization between the local HeNBs 2,3 may be needed, often in a multi-hop scenario. FIG. 1 shows an example of a basic multi-hop synchronization. A HeNB2 may derive its time/frequency from HeNB1, which in turn can derive its time from macro level node eNB0 (synchonisation eNB). The first node in the chain, the eNB0 may derive its time from an external reference, for example a Global Navigation Satellite Systems (GNSS) such as the GPS or Galileo. In this example, eNB0 has stratum 0, HeNB1 has stratum 1 and HeNB2 has stratum 2.

More generally, the order of stratums can be defied such that if a HeNB tracks another (H)eNB of stratum n, the stratum of the former HeNB is n+1. It is noted that the stratum number of a HeNB, or order of stratum, can be self-configured, and that the HeNB can be set to attempt to track a node with the lowest available stratum.

In order to enable multi-stratum synchronization, the HeNBs should be made aware of the stratum number of the (H)eNB they are tracking. Thus it is desired for the HeNB nodes to be able to signal this information to relevant HeNB nodes. In accordance with a non-limiting example in relation to the LTE, the information element can be transmitted on an existing interface, such as an X2 or Si interface.

As it is believed that the maximum number of strata is going to be relatively small in most deployments, a 2-bit value for strata expression information element (IE) has been suggested to optimise the use of signalling resources. The 2-bit value gives four different combinations, i.e. 00, 01, 10, and 11. Thus the 2-bit value can be used to support up to four stratums, for example such that 00=stratum 1, 01=stratum 2, 10=stratum 3, and 11=stratum 4. However, there may be scenarios where more than three hops may take place, this exceeding the four stratum limit.

Figure 3:
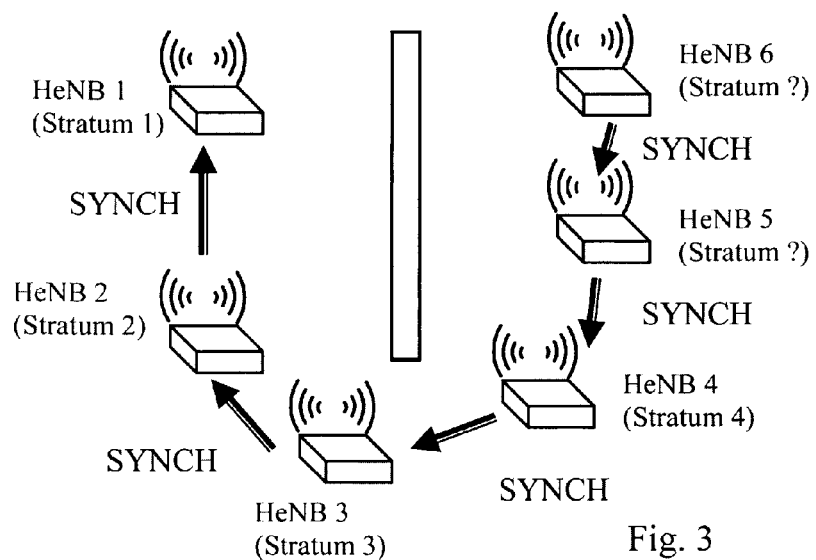

FIG. 3 illustrates such situation in a single chain scenario. The HeNB 6 in the tail of the chain may need to synchronize with its nearby neighbour because the stratum number thereof has already become relatively high, i.e. five. If the synchronization cannot take place, HeNB 6 and its neighbour HeNB 5 may interfere with each other. If the number of available bits in the information element is only two this may cause a problem in dealing with the case where the order of stratum exceeds four. That is, there is no mechanism to describe/represent stratum of more than four with a two-bit value.

Figure 4:
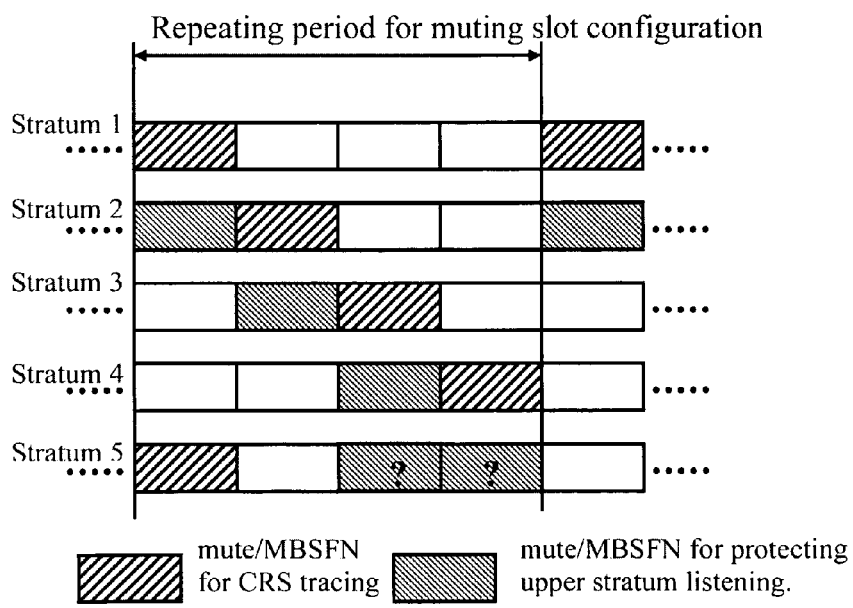
FIG. 4 shows a muting scenario.

Another problematic issue may emerge from muting slot allocation and identification of stratums whose order exceeds four for muting purposes. In accordance with a scheme illustrated in FIG. 4 a common stratum specific muting slot is configured for each of the HeNBs. This can be used when monitoring the downlink (DL) signal of other nodes as this enables a HeNB to have its neighbour HeNBs muted to avoid interference. All HeNBs in a stratum can have common muting slot to increase efficiency. However, and as exemplified by stratum 5 of FIG. 4, a stratum can become infinite as there is no definition for the fifth stratum. If a stratum is infinite, it may become difficult to configure a suitable muting slot of the stratum as all of the slots may already have been taken by lower order stratums, i.e. stratums 1-4 in FIG. 4. Furthermore, such a stratum can be difficult to indicate since the 2-bit value would only allow reference to stratums of level 4 or less.

The following explains a few exemplifying embodiments for a method for supporting an infinite number of stratums. The support can be provided without adding further signalling. It is assumed that the system supporting infinite stratum and a stratum higher than a predefined number, which in the example is three, can be uniformly indicated as an infinite stratum that is higher than the predefined number, i.e. three for a two-bit information element (IE). It is noted that although indicator 'Else' is used in the example, the naming of the status indicator is of no relevance, and any indicator could be used in here.

| Stratum | IE value |
| --- | --- |
| 1 | 00 |
| 2 | 01 |
| 3 | 10 |
| Else (MAX) | 11 |

It is noted that a highest value can be used to indicate infinite strata for any information element length similarly as shown below for a two-bit IE.

For synchronization source selection a local node HeNB can first perform a cell search to generate a list of potential synchronization sources. Sources with low signal quality can be discarded at thus stage. For simplicity, it can be assumed in this example that all sources have compatible reference timing.

Figure 5:
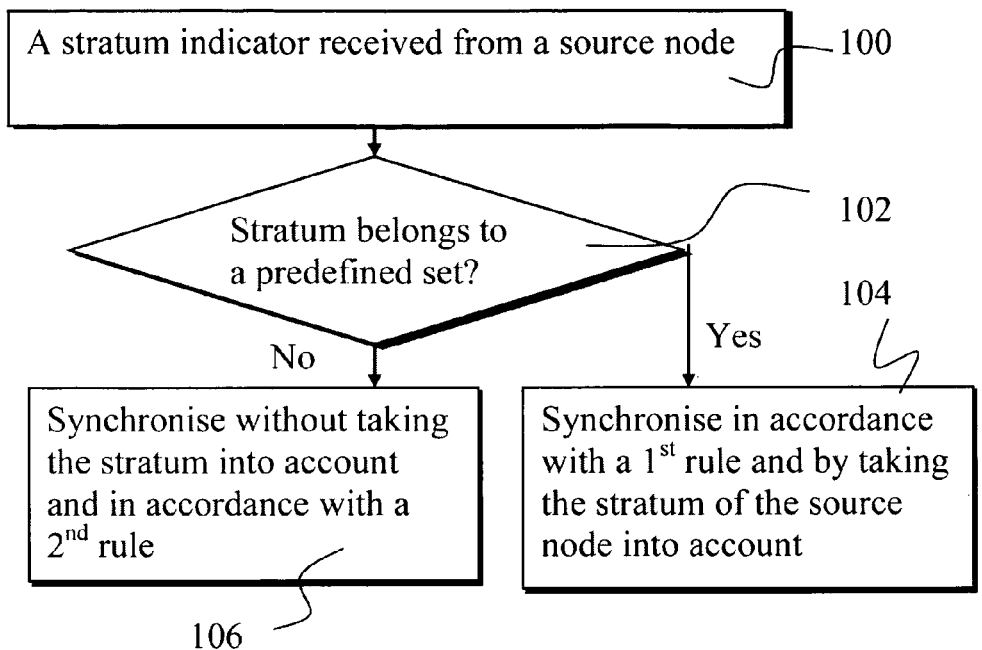
FIG. 5 is a flowchart showing an embodiment.

An example for a possible synchronisation scheme is illustrated in FIG. 5. As shown, a node can receive at 100 a stratum indicator from a synchronisation source node. If it is detected at 102 that the indicator is for a stratum that is included in a predefined set of stratums, for example a two-bit indicator is one of combinations 00, 01, 10 of the above table, the synchronisation can take place at 104 based at least in part on the order of the stratum in accordance with a first rule. For example, the HeNB can select a synchronization source based on the synchronization source list and an appropriate scheme that considers the trade off between lowest stratum number and strongest signal.

However, if it is determined at 102 based on the indication that the stratum of the synchronisation source node is not included in the predefined set of stratums, the synchronisation with the synchronisation source node takes place at 106 without taking the order of the stratum into account in accordance with a second rule. For example, the lowest stratum can be indicated as being infinite, i.e. the 'Else' Stratum of above example. The node can ignore the order number of the stratum and select, for example, a synchronization source providing the best signal quality.

It is noted that in certain implementations it is possible by default to utilize synchronisation without taking the stratum into account in accordance with the second rule. Recognition that the indicated stratum falls within the predefined range of stratums can then trigger operation in accordance with the first rule where the order of the stratum is taken into account.

At this stage the node can also identify its own stratum as 'Else', or use any other appropriate indication to inform other nodes that its stratum in the chain is higher than the predefined number. The node can then broadcast stratum 'Else' or the other appropriate indication to other nodes.

Figure 6:
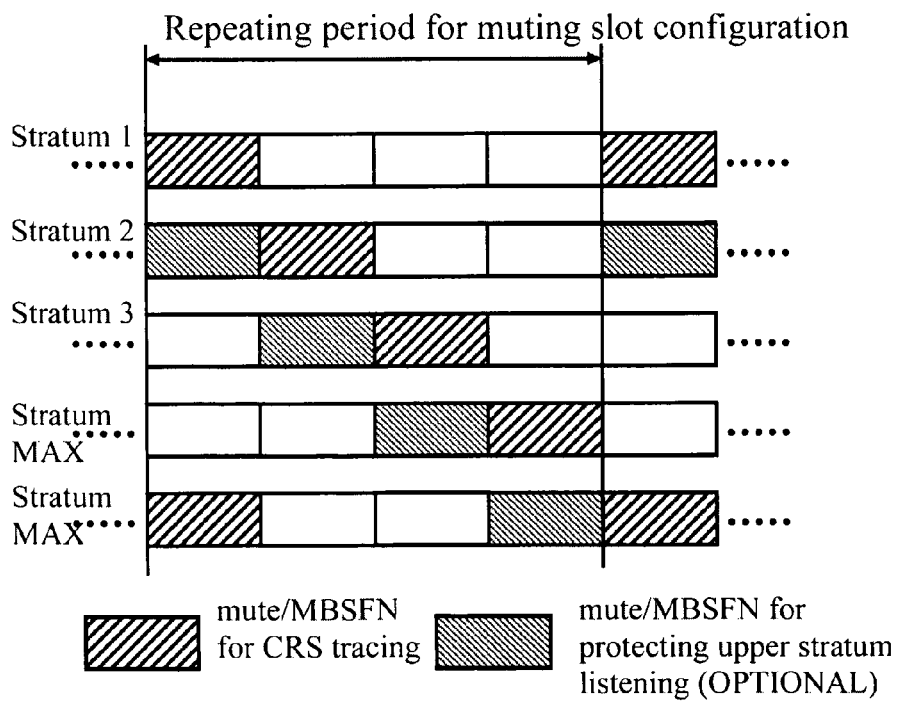
FIG. 6 shows a muting scenario in accordance with an embodiment.

FIG. 6 shows an example how to support infinite stratum/multi-hop synchronization. As shown in FIG. 6, a HeNB having stratum higher than three does not mute on a stratum-specific position of the repeat period. Instead, the HeNB can blindly detect the one or consecutive two downlink (DL) mute subframes of its synchronization source in a detection interval and mute in any other subframe where the upper layer is not muted for tracing (e.g. the subsequent subframes) to avoid creating excessive interference. That is, in the following subframe the HeNB can mute to perform tracking of a common reference signal (CRS). As a default it can be assumed that the upper layer HeNB traces the common reference signal (CRS) in the latter of the muted subframes if two muted subframes are used. It is noted that the first muted subframe is not necessary in all embodiments. Therefore, although this can be used to avoid interference to the listening by the node in the upper layer stratum, this is only optional.

As shown in FIG. 6, in contrary to other stratums, the stratum "Else" will have HeNBs which are using one or more different subframes to mute than the upper layers.

This muting scheme can be used for example to ensure that the strongest neighbour HeNB is muted when a HeNB is reading the common reference signal (CRS). For example, as shown in FIG. 6, each HeNB with stratum "Else" can decide its muting place following the configuration of the upper layer and shift right a subframe by one on that basis.

Normally the muting subframes for protecting upper level and for listening upper level common reference signal (CRS) is a consecutive operation. That is, the HeNB can mute the last subframe of the repeating period and the first subframe of the next repeating period, and thus the muting can be consecutive as shown in FIG. 6, see the last row.

A HeNB that has adopted "Else" stratum can thus blindly detect a mute subframe of its synchronization source and also optionally mute in that subframe to avoid creating excessive interference for the upper layer. In accordance with an embodiment, the following subframe can also be muted for tracking of CRS to avoid interfering with the synchronization source.

If several such HeNBs are in "Else" stratum that can hear each other, this means that their synchronization structure is not necessarily a chain. Each HeNB can yet select its muting configuration by itself based for example on a power and stratum balance rule. For example, a HeNB can select a suitable synchronization source which can be the most severe interferer to the HeNB, or vice versa. The HeNB can self select a muting place to ensure that no severe interference is caused between the two stations.

It is noted that the manner how the muting function is provided is not relevant in understanding the embodiments. The muting can be provided, for example, based on a special subframe or based on a Multicast Broadcast Single Frequency Network (MBSFN) subframe. If MBSFN subframes are used the HeNB may need to have freedom to allocate by itself the MBSFN subframes so that it can select which ones to mute.

It is noted that this solution is also applicable in situations where lesser stratums are to be considered. For example, in a two stratum solution a single bit can be used to indicate whether a node is synchronised with GPS or not. Similarly, the above described muting can be applied in embodiments where synchronisation is determined by default without taking the stratum into account.

An advantage of the embodiment is that it provides scalable support of infinite stratums over air interface synchronisation between HeNBs.

The required data processing apparatus and functions of a base station apparatus as well as appropriate communication devices may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor-based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for determining the stratum indications and/or for rule selection and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to LTE, similar principles can be applied to any other wireless communication system to support uncoordinated local area deployments. Therefore, although certain embodiments were described above by way of example with reference to certain exemplifying architectures for wireless networks, technologies and standards, embodiments may be applied to any other suitable forms of communication systems than those illustrated and described herein. For example, similar principles can be applied to 3GPP 3G femto and all other femto technologies, for example WiMAX systems.

It is also noted herein that while the above describes exemplifying embodiments of the invention, there are several variations and modifications which may be made to the disclosed solution without departing from the scope of the present invention.

The invention claimed is:

1. A method comprising:
   receiving an indication from a node of a communication system in which communications occur via a plurality of nodes each providing a stratum for syncronisation, wherein the indication comprises one of the order number of the stratum if the stratum of the node transmitting the indication is in a predefined set of stratums, and a uniform indication if the stratum of the node is not in the predefined set of stratums;
   determining whether or not the stratum of the node is included in a predefined set of stratums in which case synchronisation with the node would be based at least in part on the order of the stratum; and
   in response to determining that the stratum is not included in the predefined set of stratums, synchronizing with the node differently from nodes with stratums that are determined to be included in the predefined set of stratums without taking the order of the stratum into account.

2. A method according to claim 1, wherein the determining comprises determining based on an indication received from the node that the synchronisation shall not take the order of the stratum into account.

3. A method according to claim 1, wherein the predefined set of stratums comprises a predefined number of lowest order stratums, comprising sending or receiving an indication from a node with a higher order of stratum that synchronisation with said node is to be handled differently from nodes with stratums in the predefined set of stratums.

4. A method according to claim 1, wherein the predefined set of stratums comprises three lowest order stratums, comprising sending or receiving in a two-bit information element an indication of the order of the stratum or an indication that the order of the stratum is higher than three.

5. A method according to claim 1, wherein synchronisation without taking the order of the stratum into account comprises selecting a synchronisation source node that has the best signal quality.

6. A method according to claim 1, wherein the determining comprises determining by default that the synchronizing shall take place without taking the order of the stratum into account.

7. A method according to claim 1, wherein
synchronisation that takes the order of the stratum into account comprises muting at least one stratum specific position of a period, and
synchronisation without taking the order of the stratum into account comprises detection of muting applied by a synchronisation source node and muting at least one position of the period based on the detection.

8. A method according to claim 7, wherein synchronisation without taking the order of the stratum into account comprises muting of at least one Multicast Broadcast Single Frequency Network (MBSFN) frame based on detection of the positioning of at least one MBSNF frame by the node.

9. A method according to claim 7, wherein a frame position corresponding to a detected frame position is muted.

10. A method according to claim 7, wherein a frame position determined based on a detected frame position is muted.

11. A non-transitory computer readable medium storing a program of instructions, execution of which by a processor configures an apparatus to perform the steps of claim 1.

12. A method comprising:
determining whether or not the stratum of a node operating in a communication system in which communications occur via a plurality of nodes each providing a stratum for synchronisation is included in a predefined set of stratums in which synchronisation with the node would be based at least in part on the order of the stratum;
generating an indication to inform at least one other node of the status of the stratum, wherein the indication comprises one of the order number of the stratum if the stratum of the node is in the predefined set of stratums, and a uniform indication if the stratum of the node is not in the predefined set of stratums, wherein, in case it is determined that the stratum of the node is not included in the predefined set of stratums, the indication informs at least one other node that synchronisation with the node shall take place differently from nodes with stratums that are determined to be included in the predefined set of stratums without taking the order of the stratum into account, and in case it is determined that the stratum of the node is included in the predefined set of stratums, the indication informs the at least one other node that synchronization shall be based at least in part on the order of the stratum; and
sending the indication.

13. A method according to claim 12, wherein the indication is broadcasted.

14. An apparatus comprising:
at least one processor, and
at least one memory including computer program code,
wherein the at least one memory and the computer program code are configured, with the at least one processor, to:
receive an indication from a node of a communication system in which communications occur via a plurality of nodes each providing a stratum for syncronisation, wherein the indication comprises one of the order number of the stratum if the stratum of the node transmitting the indication is in a predefined set of stratums, and a uniform indication if the stratum of the node is not in the predefined set of stratums;
determining whether or not the stratum of the node is included in a predefined set of stratums in which case synchronisation with the node would be based at least in part on the order of the stratum;
in response to a determination that the stratum of the node is not included in the predefined set of stratums, cause synchronisation with the node differently from nodes with stratums that are determined to be included in the predefined set of stratums without taking the order of the stratum into account.

15. An apparatus according to claim 14, wherein the predefined set of stratums comprises a predefined number of lowest order stratums, and the apparatus is configured to process the indication received from or to be sent by a node with a higher order of stratum that synchronisation with said node is to be handled differently from nodes with stratums in the predefined set of stratums.

16. An apparatus according to claim 14, wherein the predefined set of stratums comprises three lowest order stratums, and the apparatus is configured to cause sending or receiving of an indication of the order of the stratum or that the order of the stratum is higher than three in a two-bit information element.

17. An apparatus according to claim 14, configured to cause synchronisation without taking the order of the stratum into account such that a synchronisation source node that has the best signal quality is selected.

18. An apparatus according to claim 14, configured to determine by default that the synchronizing shall take place without taking the order of the stratum into account.

19. An apparatus according to claim 14, wherein the apparatus is configured to cause
synchronisation that takes the order of the stratum into account by muting at least one stratum specific position of a period, and
synchronisation that does not take the order of the stratum into account based on detection of muting applied by a synchronisation source node and muting of at least one position of the period based on the detection.

20. An apparatus according to claim 19, wherein the apparatus is configured to cause said synchronisation that does not take the order of the stratum into account based on detection of positioning of at least one Multicast Broadcast Single Frequency Network (MBSFN) frame account comprises and to cause muting of at least one Multicast Broadcast Single Frequency Network (MBSFN) frame based on the detection.

21. An apparatus according to claim 19, configured to cause muting of a frame position based on a detected frame position.

22. A base station comprising the apparatus of claim 14.

23. A communication system comprising the apparatus in accordance with claim 14.

24. A communication system according to claim 23, comprising at least one of a femto access point and a macro access point.

25. An apparatus comprising:
at least one processor, and
at least one memory including computer program code,
wherein the at least one memory and the computer program-code are configured, with the at least one processor, to:
determine whether or not the stratum of a node operating in a communication system in which communications occur via a plurality of nodes each providing a stratum for synchronisation is included in a predefined set of stratums in which case synchronisation with the node would be based at least in part on the order of the stratum;
generate an indication to inform at least one other node of the status of the stratum, the indication comprising one of the order number of the stratum if the stratum of the node is in the predefined set of stratums, and a uniform indication if the stratum of the node is not in the predefined set of stratums; and to cause, in response to determination that the stratum is not included in the predefined set of stratums, sending of information to at least one other node that synchronisation with the node shall take place differently from nodes with stratums that are determined to be included in the predefined set of stratums without taking the order of the stratum into account.

26. An apparatus according to claim 25, wherein the indication is broadcasted.

* * * * *